April 16, 1963   J. C. HANBURY   3,085,686
AUTOMATIC LUMBER SORTER
Filed Nov. 28, 1961   17 Sheets-Sheet 1

Inventor
John Carter Hanbury
By Cushman, Darby & Cushman
Attorneys

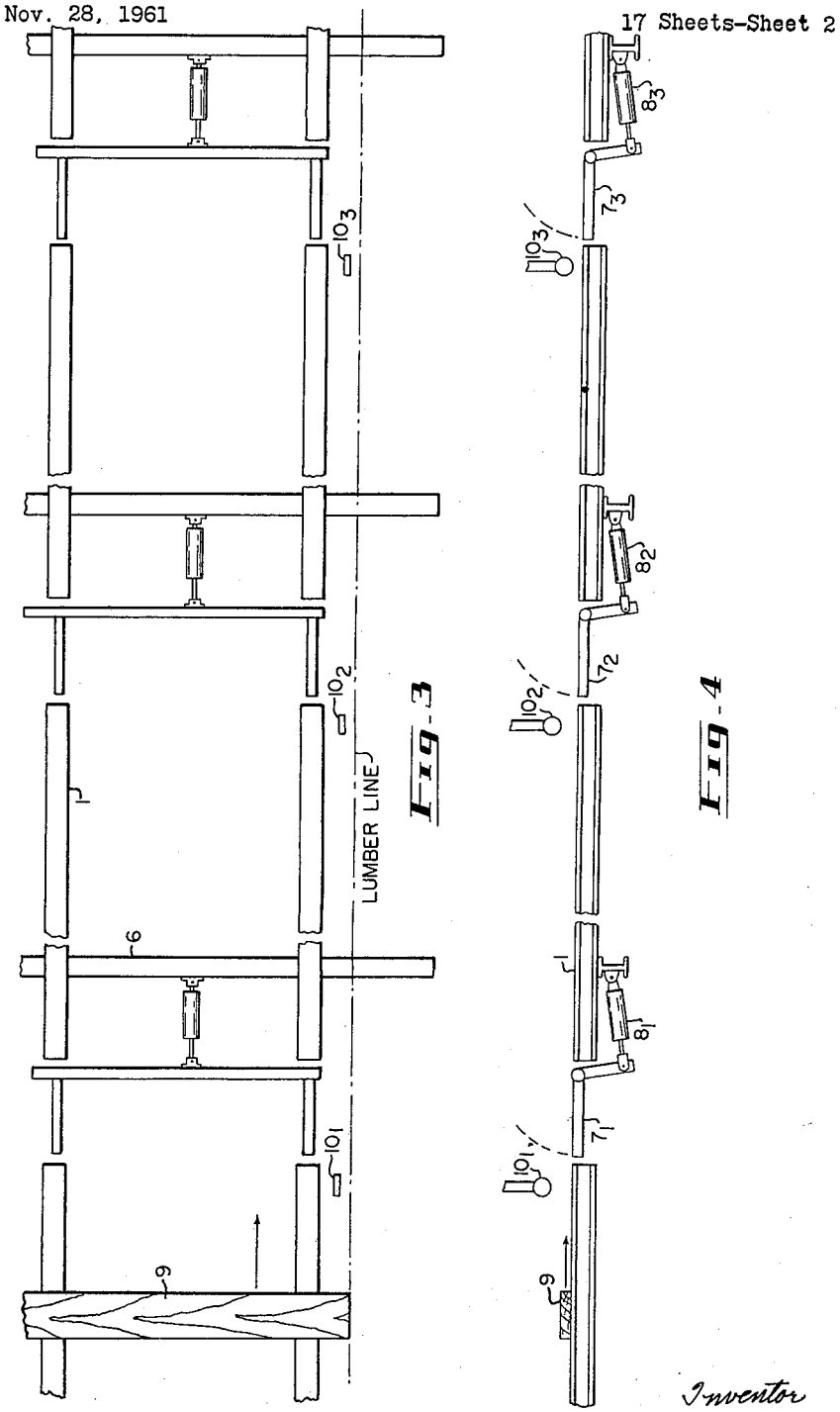

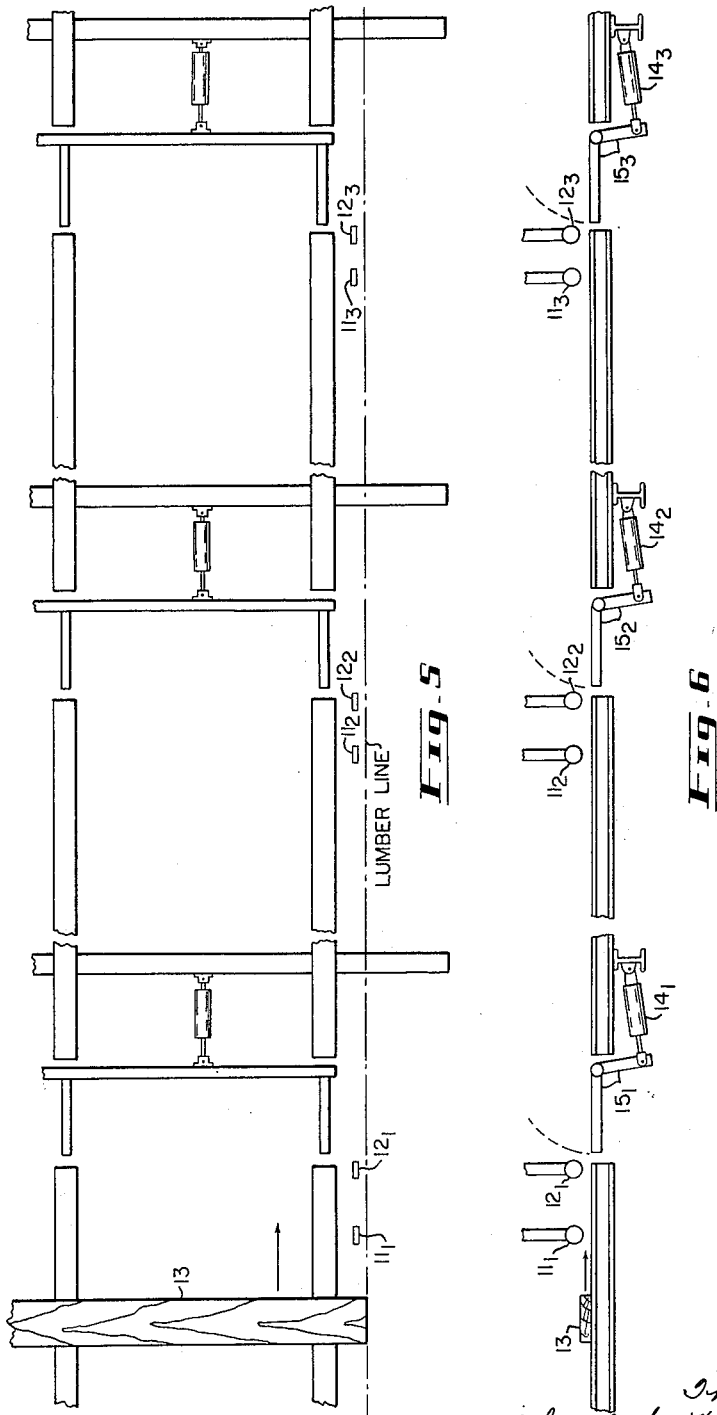

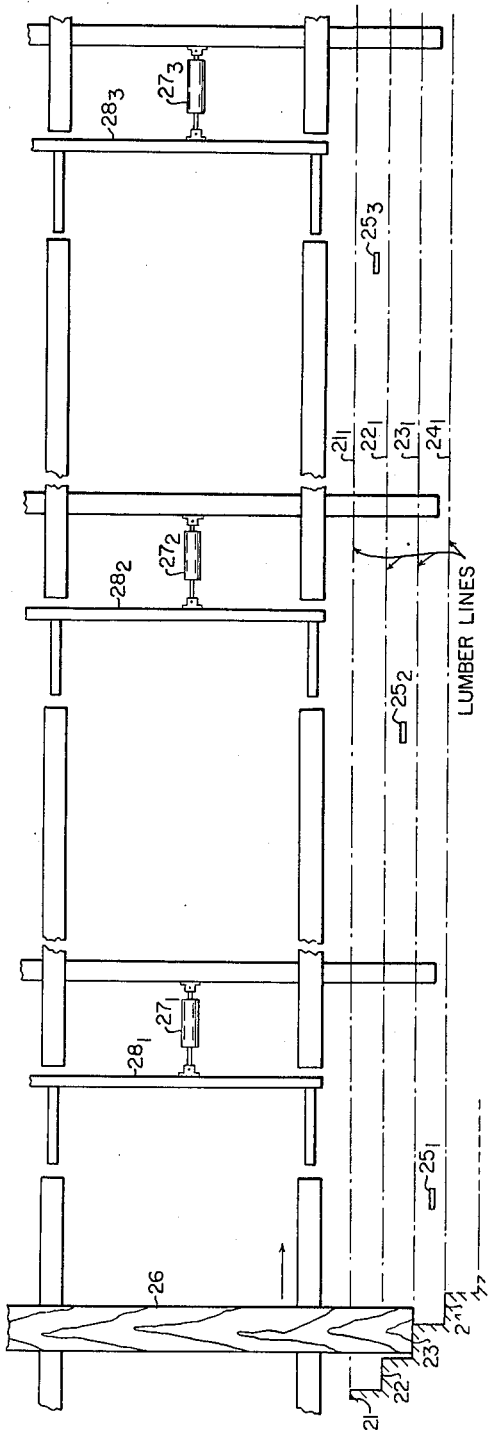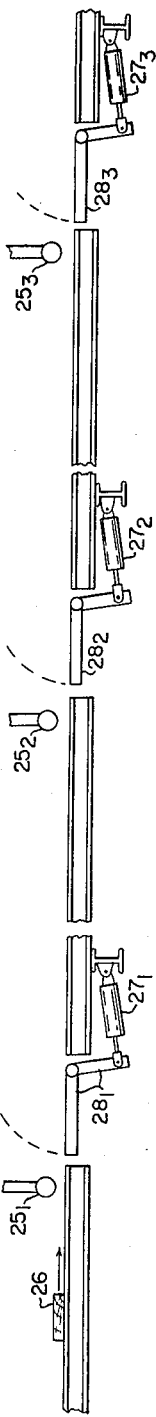
Fig. 7
Fig. 8
Inventor
John Carter Hanbury
By Cushman, Darby & Cushman
Attorneys

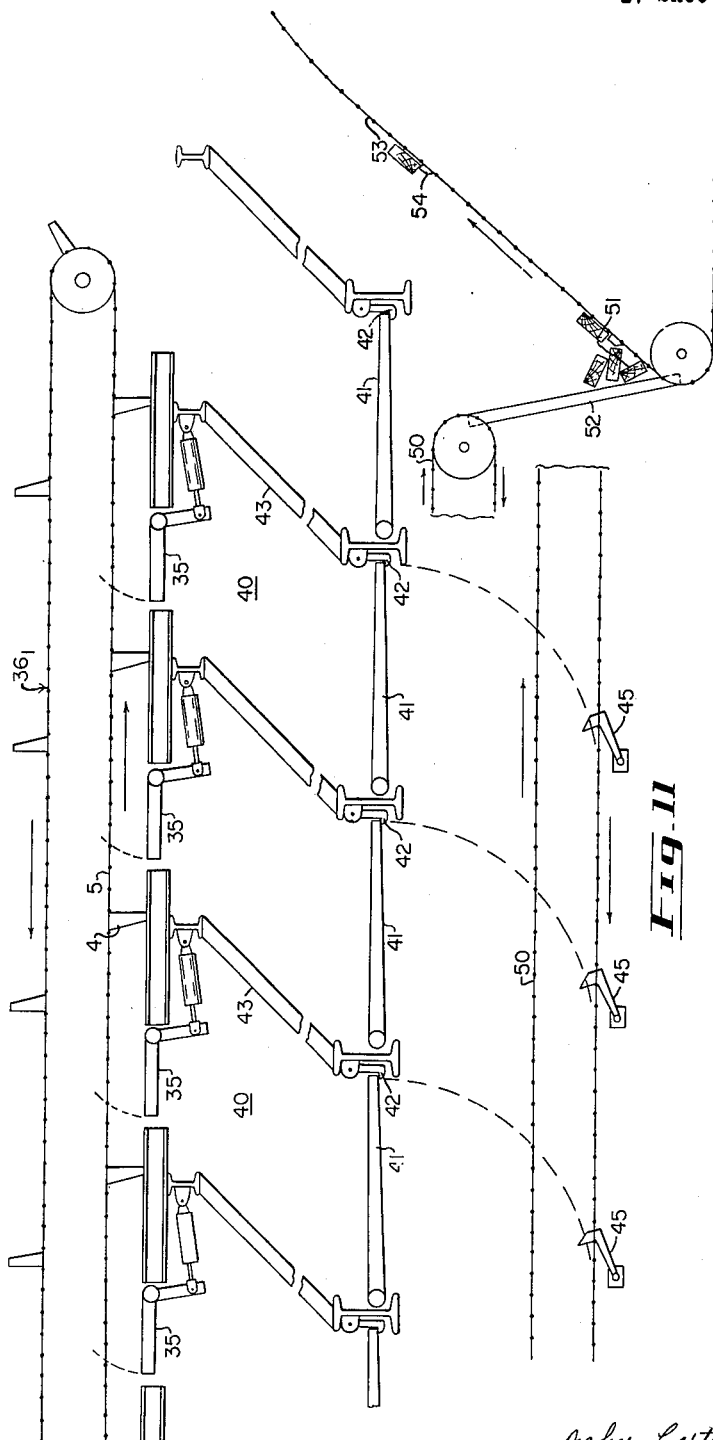

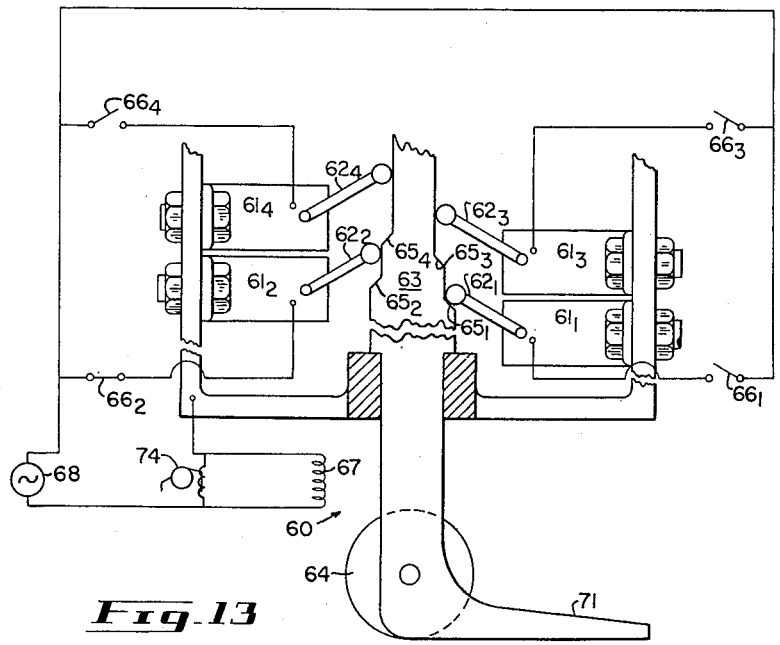
Fig.13
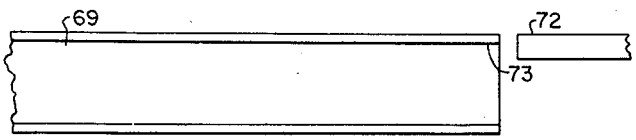
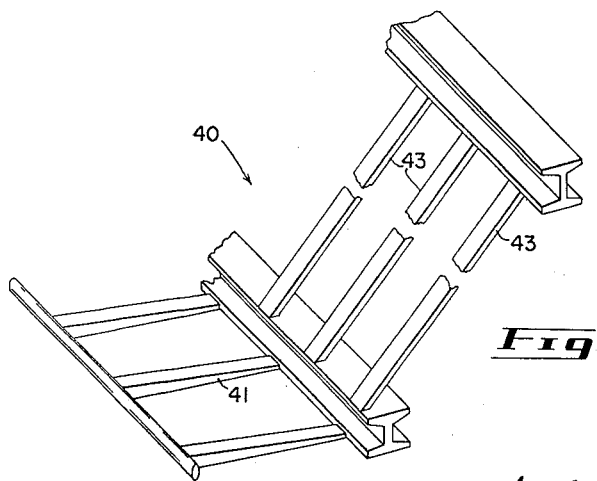
Fig.12

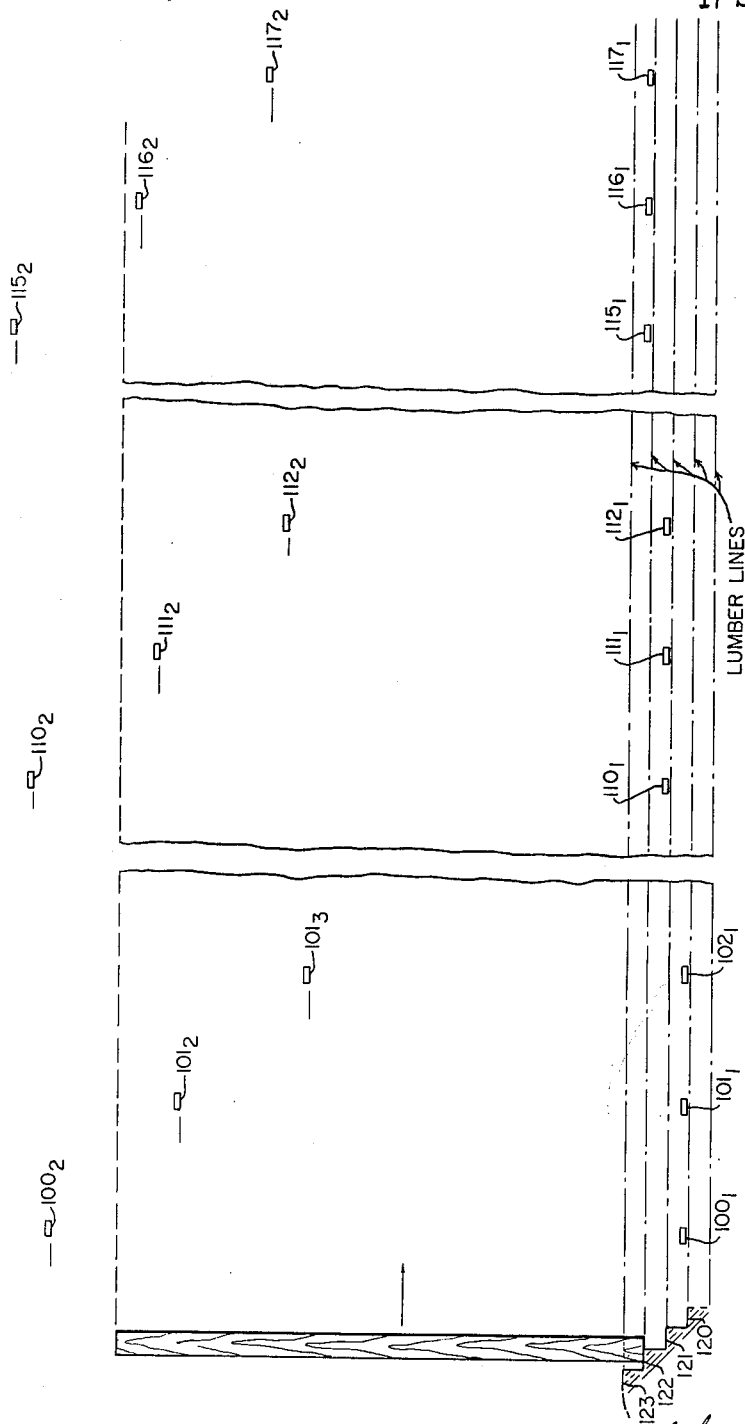

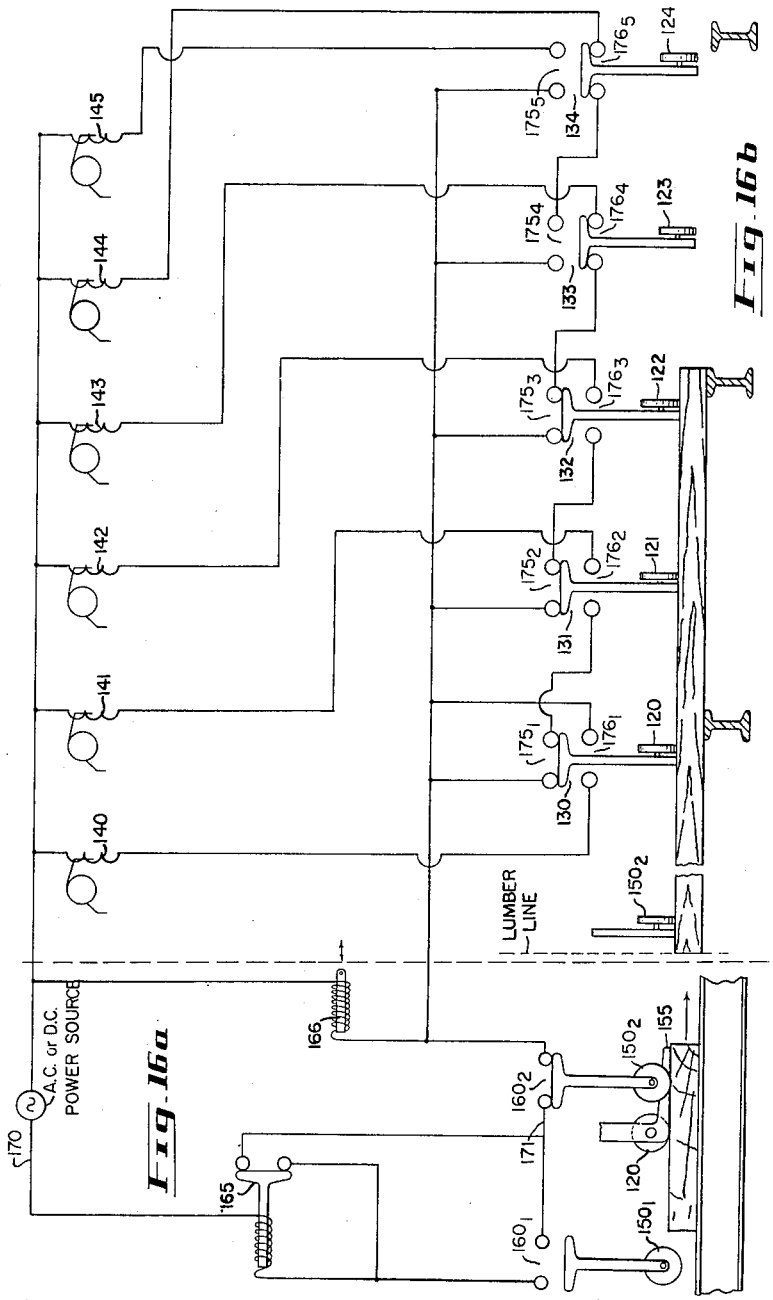

April 16, 1963 J. C. HANBURY 3,085,686
AUTOMATIC LUMBER SORTER
Filed Nov. 28, 1961 17 Sheets-Sheet 11
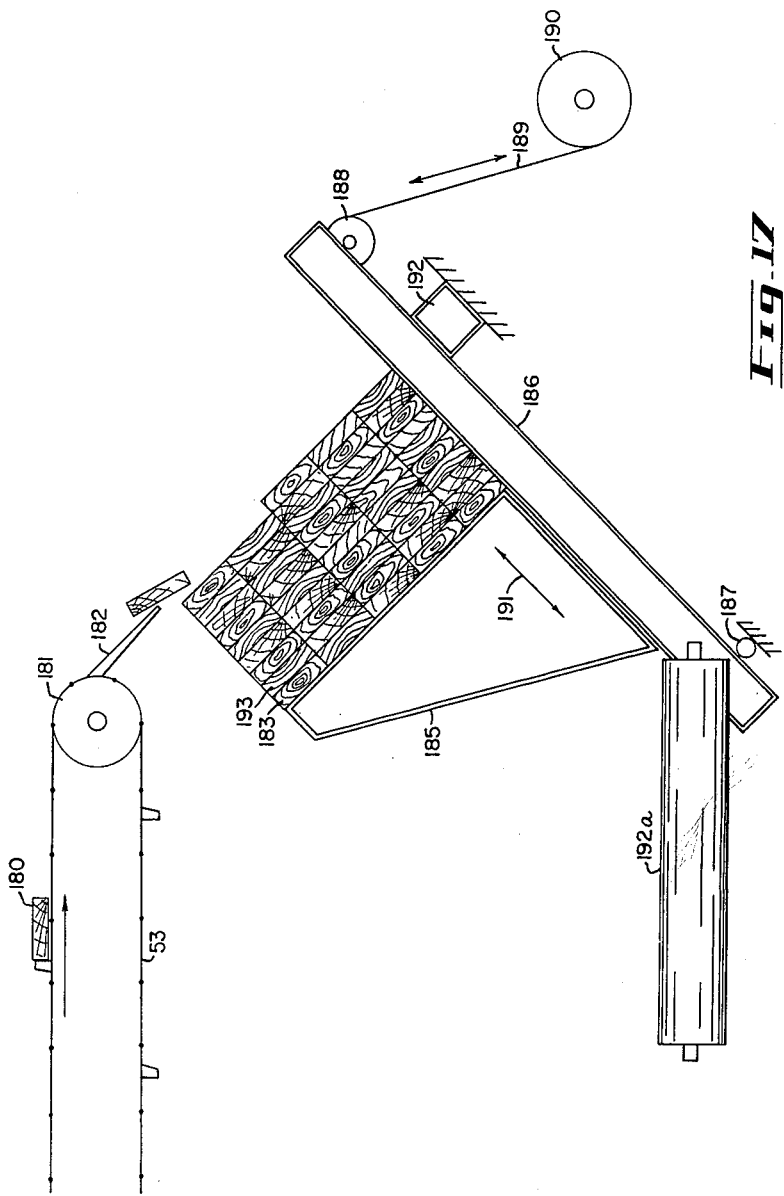
Inventor
John Carter Hanbury
By Cushman, Darby & Cushman
Attorneys

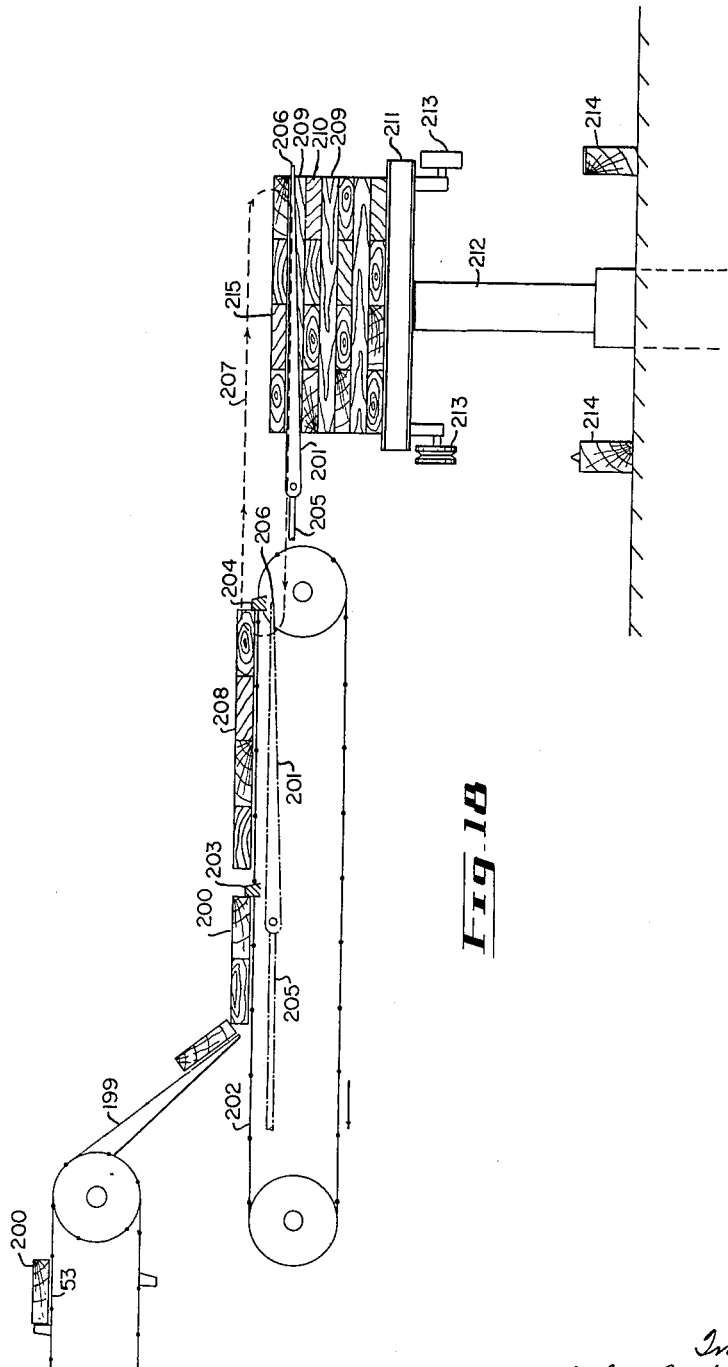

April 16, 1963
J. C. HANBURY
3,085,686
AUTOMATIC LUMBER SORTER
Filed Nov. 28, 1961
17 Sheets-Sheet 13
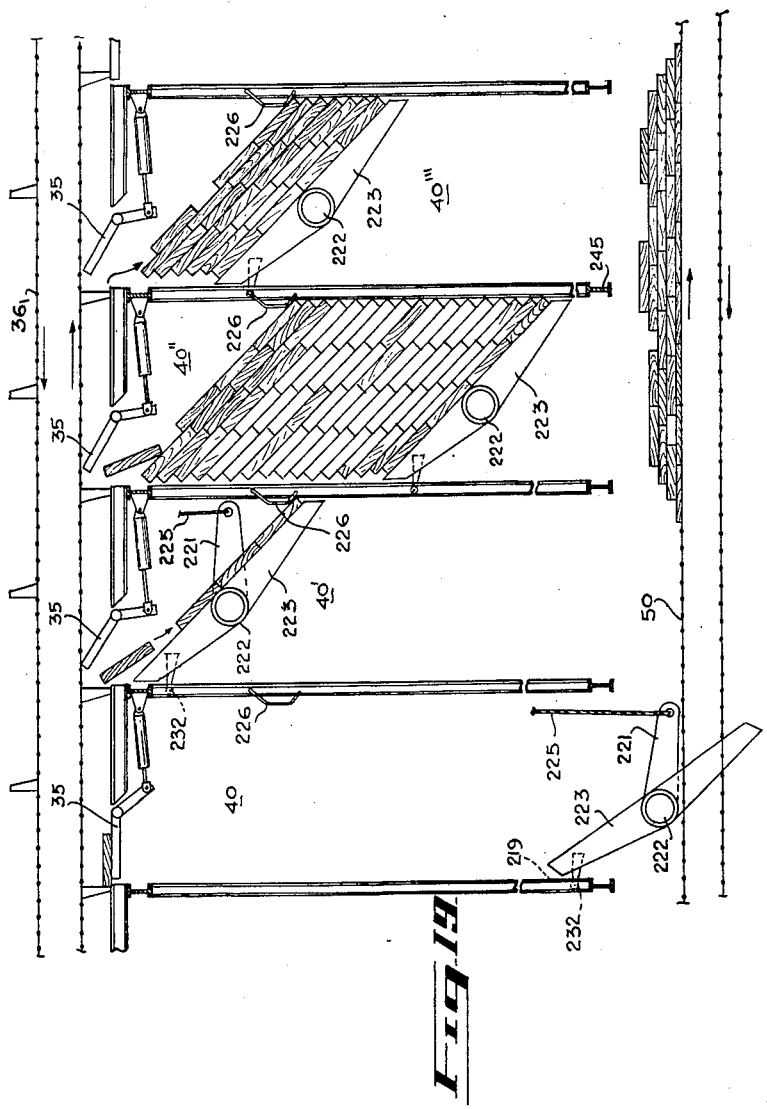

April 16, 1963
J. C. HANBURY
3,085,686
AUTOMATIC LUMBER SORTER
Filed Nov. 28, 1961
17 Sheets-Sheet 14
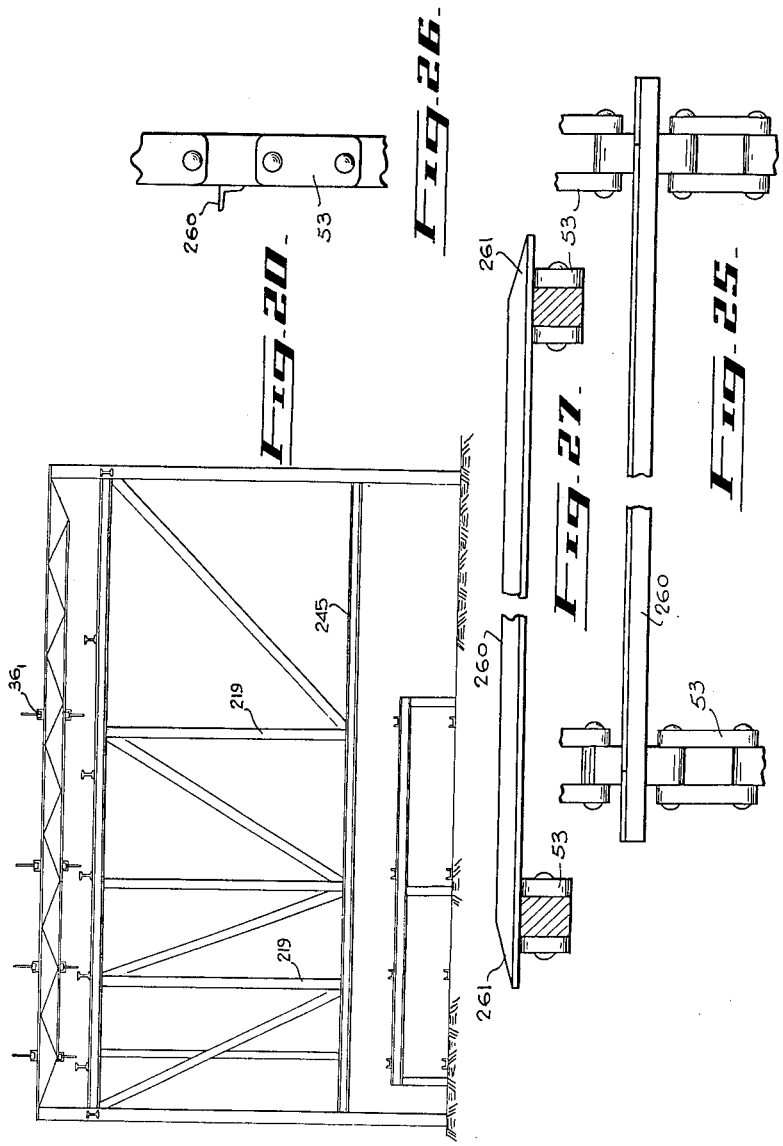
Inventor
John Carter Hanbury
By Cushman, Darby & Cushman
Attorneys

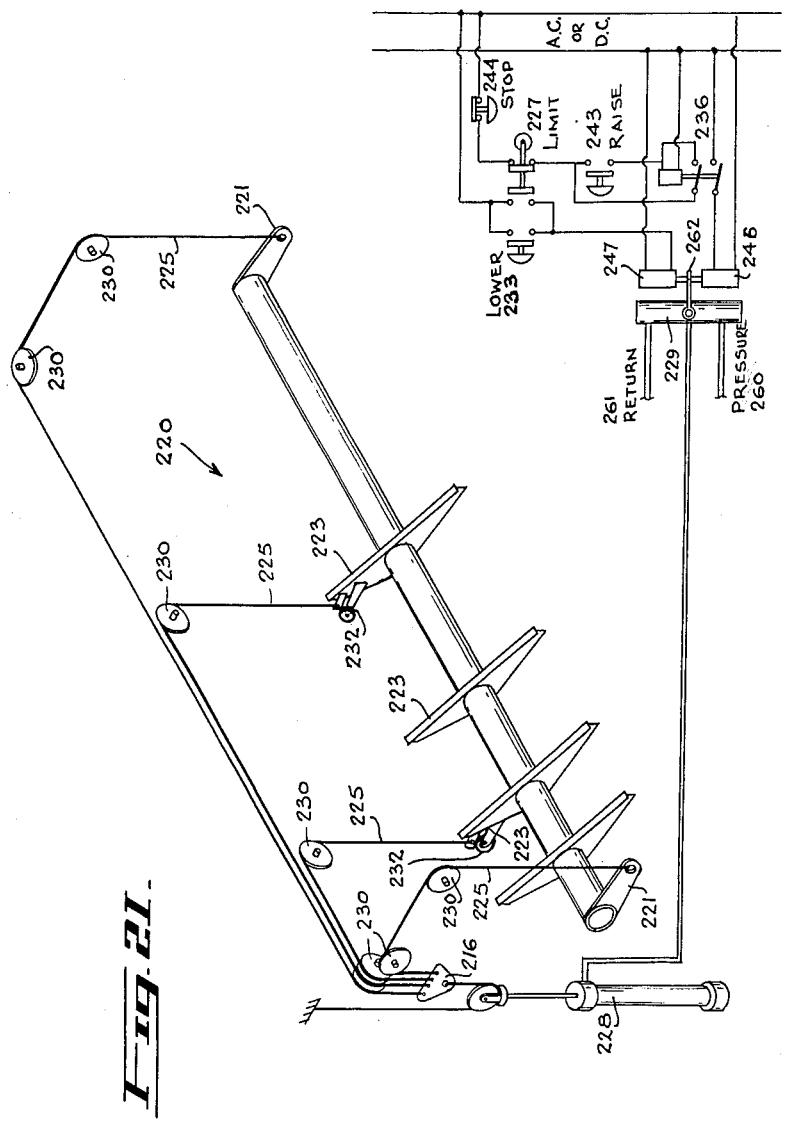

April 16, 1963
J. C. HANBURY
3,085,686
AUTOMATIC LUMBER SORTER
Filed Nov. 28, 1961
17 Sheets-Sheet 16
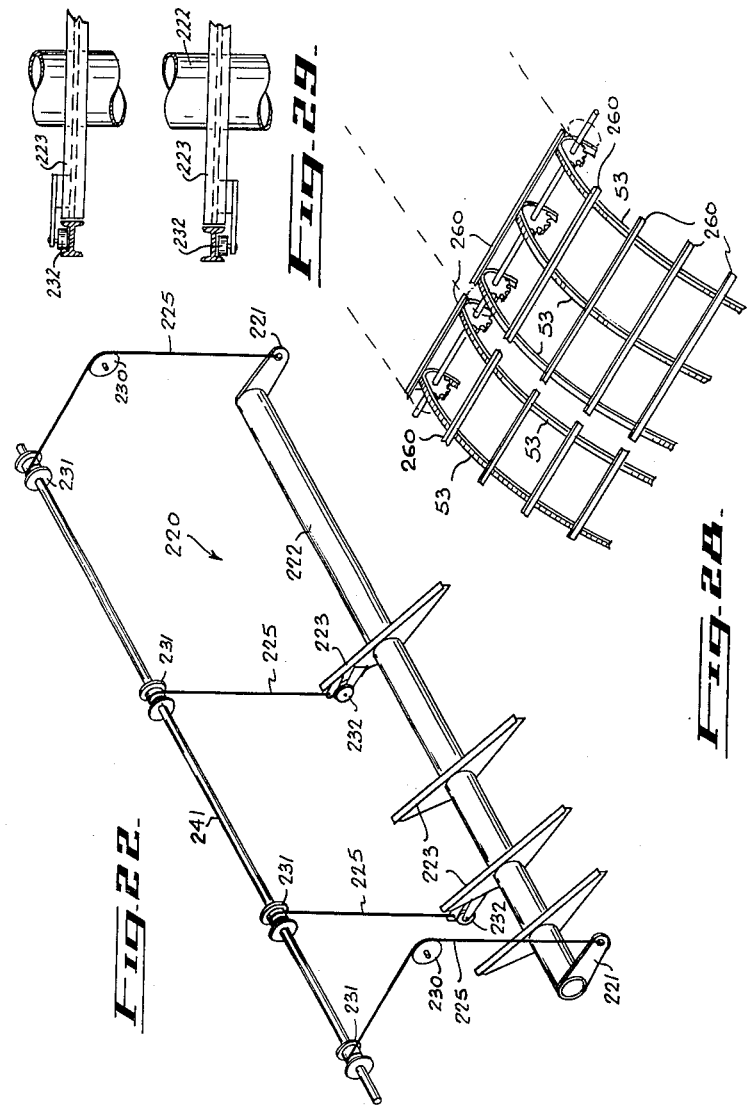
Inventor
John Carter Hanbury
By Cushman, Darby & Cushman
Attorneys

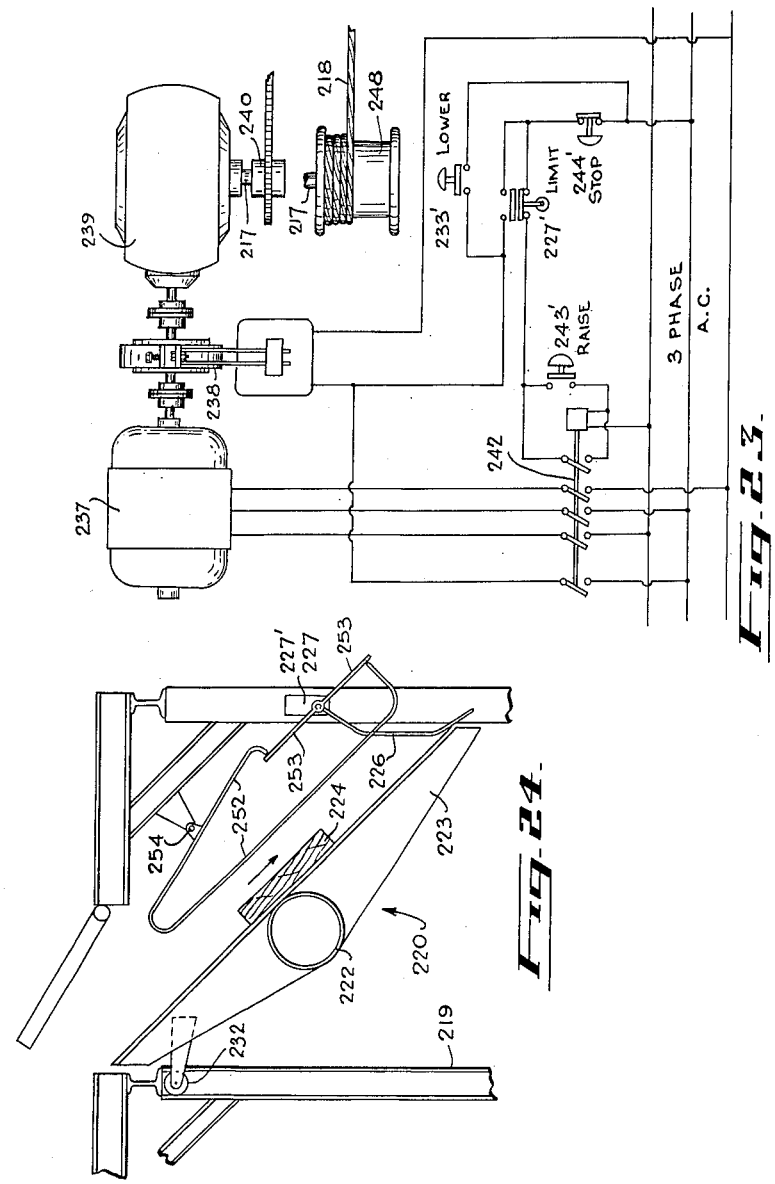

United States Patent Office 3,085,686
Patented Apr. 16, 1963

3,085,686
AUTOMATIC LUMBER SORTER
John C. Hanbury, Box 302, Prince George,
British Columbia, Canada
Filed Nov. 28, 1961, Ser. No. 155,393
9 Claims. (Cl. 209—82)

This application is a continuation-in-part of my application Serial Number 37,279 filed June 20, 1960.

This invention relates to a machine to be used for the automatic sorting of lumber for thickness, for width and for length, the semi-automatic sorting of lumber for grade, for species and for pattern, and the tallying of the number of boards of each length in any one size. Throughout this description the term "grade" shall include in its connotation the factors of species and pattern.

The invention also relates to a lumber sorter which can deliver lumber for stacking without the necessity for arranging of the sorted planks by hand for the stacker which has been necessary previously.

The value and the end use of lumber are determined by its thickness, width, length and grade. Consequently, on various occasions from the time of manufacture up to the time of ultimate use, the lumber is segregated into units in which the individual pieces have similar thickness, width, length and grade. The units must be neatly piled and of fairly uniform size to enable them to be efficiently handled by fork and lift trucks. In most cases, this sorting of the lumber is at present done manually by a number of men who remove the lumber from a series of moving chains or a belt and pile it in unit packages of lumber having similar qualities. These men determine the thickness, width and length visually, and the grade from a symbol previously marked on each piece of lumber by a skilled lumber grader. The cost of the manual sorting of lumber by these men adds appreciably to the cost of manufacture of the lumber. The work of the grader requires judgment and so is not economically susceptible to replacement by a machine at the present state of the mechanical arts.

It is an object of the invention herein described, to permit the automatic sorting of lumber for thickness, width and length, and the semi-automatic sorting of lumber for grade which used in conjunction with one of the devices now commonly used for stacking lumber, will reduce the number of men required and hence the cost of sorting lumber. When the device for semi-automatic sorting for grade is employed, the grader instead of marking a grade symbol on each piece of lumber, will move it longitudinally so that the ends of all pieces of a common grade move in the same plane. This permits the lumber to be automatically segregated into the various grades by the device. When the device is used for sorting lumber for thickness, width or length, this quality of the lumber automatically effects the sorting action. These devices may be used singly or in successive combination to effect the segregation of the lumber into units having one or more of the properties of thickness, width, length or grade in common. While it is possible by the proper arrangement of the trip devices in a machine of sufficient length to make the separate sorts of lumber contain only pieces having similar thickness, width, length and grade in a single passage through, the number of sorts required would be so great (normally over 2000) that the sorter would be excessively long. Hence it is probable that the sorter will be employed to segregate the lumber for two only of the above qualities on one passage through. The sorted lumber passes to a bin where pieces with common properties are stored until a unit of the desired number of pieces has accumulated. When a unit has accumulated in one of the bins it is discharged onto moving chains and carried first to a device which separates and straightens the lumber so that it proceeds one piece at a time along a transfer which moves the lumber transversely to its length, and thence to a tilt hoist stacker or a reciprocating arm stacker, both commonly used devices for stacking lumber rapidly with little labor.

Since all the devices are identical except for the position of limit switches which determine the type of sorting function (thickness, width, length or grade), one machine could be used to effect, on one passage through, the sortation for say thickness and width, and by energizing a second set of limit switches, on a second passage through, the sortation for grade and length.

According to the invention, there is provided a lumber handling system comprising, a lumber platform, means for moving lumber transversely across said platform, a plurality of gates in said platform, each said gate having an open and a closed position, said lumber being carried across each said gate when in its closed position, and dropping from said platform through a said gate when in its open position, a plurality of electrical trip means above said platform, each of said trip means being associated with a respective gate, said trip means being so placed relatively to said platform for engagement by lumber when of a chosen dimension to open said respective gate, a bin below each said gate, a platform in said bin for receiving and supporting lumber entering the bin and inclined at an angle to the horizontal greater than the angle of repose of lumber on said bin platform and of lumber on other pieces of lumber in said bin, means for lowering the bin platform, a limit switch in said bin for engagement by lumber on said bin platform projecting above a chosen level in said bin, said switch being connected to said lowering means to lower said bin platform to move said lumber out of engagement with said switch, means for releasing lumber from said bin, a lumber transfer below said bin for receiving lumber released from said bin, an inclined conveyor comprising a plurality of laterally spaced members being advanced at the same speed as one another, lugs on said members for holding a piece of lumber transversely to the direction of travel of the inclined conveyor, said lugs projecting from said members sufficiently only to engage and carry a single piece of lumber, said transfer being arranged to discharge lumber transversely into a well for gripping by said inclined conveyor lugs, whereby lumber is discharged one piece at a time from said inclined conveyor with its length transverse to the direction of discharge.

In the drawings which illustrate embodiments of the invention:

FIGURE 3 shows a plan view of a sorter for lumber thickness;

FIGURE 4 shows a side view of the sorter of FIGURE 3;

FIGURE 5 shows a plan view of a sorter for lumber width;

FIGURE 6 shows a side view of the sorter of FIGURE 5;

FIGURE 7 shows a plan view of a sorter for lumber grade;

FIGURE 8 shows a side view of the sorter of FIGURE 7;

FIGURE 11 shows a side view of a sorter and of apparatus for storage and passage of sorted lumber to be stacked;

FIGURE 12 shows a 3-dimensional view of part of a storage bin for sorted lumber;

FIGURE 13 shows a side partly diagrammatic view of a trip mechanism for use in the sorters described;

FIGURE 15 shows a plan view of a sorter for lumber grade and length;

FIGURE 16a shows a partly diagrammatic side view of a tally mechanism for use with a sorter for thickness and width;

FIGURE 16b shows a partly diagrammatic front view of the mechanism of FIGURE 16a in which the lumber shown is advancing towards the reader out of the plane of the drawing;

FIGURE 17 shows a side elevation of a commonly employed tilt hoist stacker;

FIGURE 18 shows a side view of a commonly employed reciprocating arm stacker;

FIGURE 19 shows a side view of the collecting bins;

FIGURE 20 shows an end view sectioned along line 20—20 of FIGURE 19;

FIGURE 21 shows a three-dimensional view of a bin platform, and suspension assembly with diagrammatically shown electro-hydraulic motive means and schematic wiring diagram;

FIGURE 22 shows a three-dimensional view of another suspension system for a bin platform;

FIGURE 23 shows electro-mechanical motive means for the bin platform and schematic wiring diagram for the bin suspension system;

FIGURE 24 shows a side view of part of the platform, bin sides and the controlling limit switch assembly;

FIGURES 25, 26 and 27 show plan, side, and end views respectively of an improved lug for use in practicing the invention;

FIGURE 28 shows a perspective view of the inclined conveyor of FIGURE 11 including the improved lugs; and FIGURE 29 shows a plan view of the bin platform in engagement with the guide rails.

Figure 1:
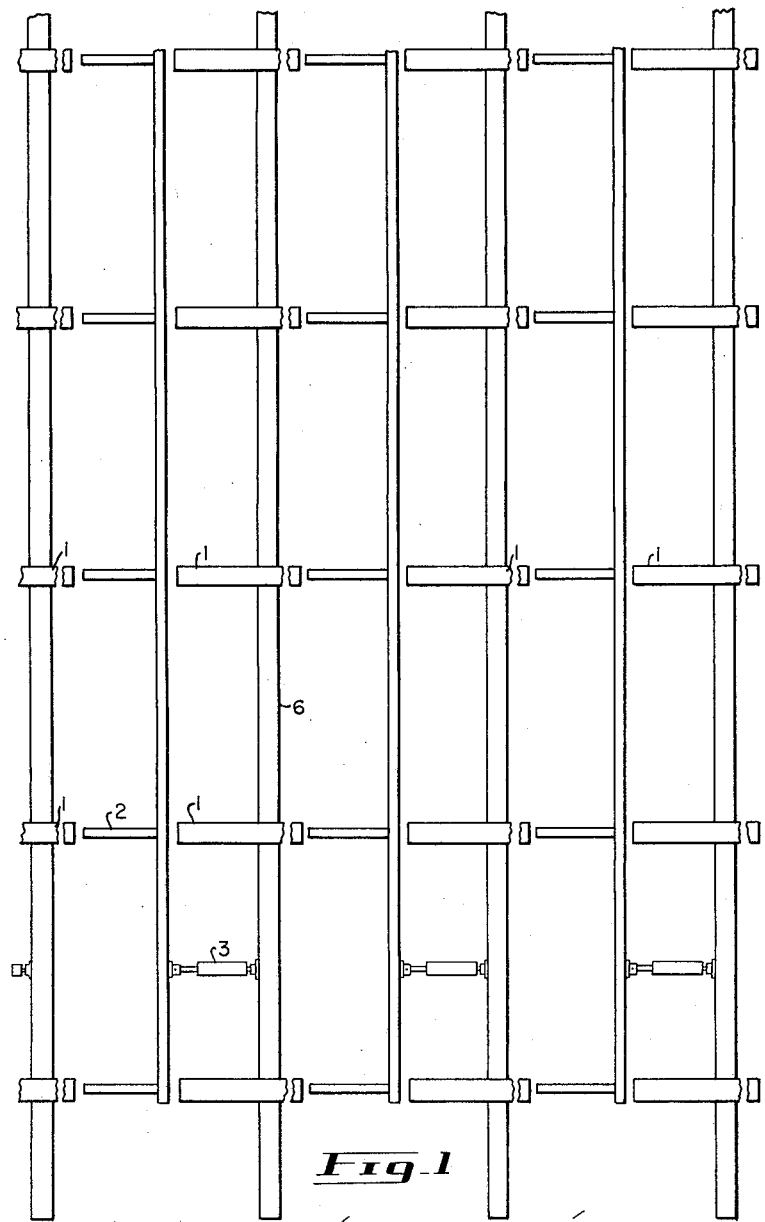
FIGURE 1 shows a plan view of part of a sorter platform.
Figure 2:
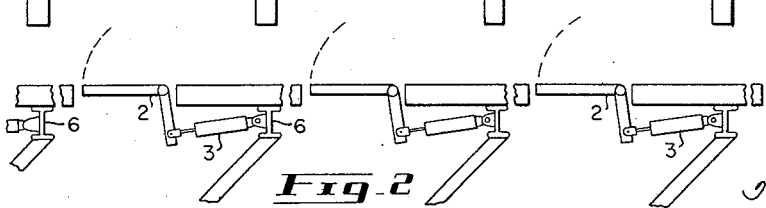
FIGURE 2 shows a side view of the platform of FIGURE 1.

For clarity, some of the supporting frame members have been omitted from the drawings, but having reference to FIGURES 1 and 2, the machine shown comprises a number of horizontal parallel rails 1 supported on beams 6 mounted between gates 2 which lie in the same plane and are capable of being individually opened by electromechanical devices 3. The lumber to be sorted rests on the rails on its wider face with its length perpendicular to the length of the rails 1. The lumber is moved along the tops of the rails and over the top of closed gates 2 in the direction from left to right and parallel to the length of the rails by the lugs 4 of an overhead chain 5 (See FIGURE 11). The rails and closed gates thus make a platform for the lumber.

Referring now to FIGURES 3 and 4, trip devices 10 which are operated by contact with the lumber passing beneath are mounted above the level of the platform. The encounter of any one of these trip devices 10 by lumber, closes a limit switch connected to a power source (not shown) and an associated one of the electro-mechanical devices 3 for opening one of the gates 2 to which the device 3 is coupled. The lumber thus moves along the tops of the rails 1 and across the gates 2 until upon contact with one of the trip devices 3, the gate 2 being approached is opened, allowing lumber 9 to drop from the platform 2.

FIGURES 3 and 4 show the arrangement of three of a series of trip devices, $10_1$, $10_2$, $10_3$, so arranged as to effect the segregation of lumber into pieces of uniform thickness. Lumber moving in the direction from left to right of the figure passes successively under trip devices $10_1$, $10_2$, $10_3$, etc. until it comes in contact with one of them, thus, causing the corresponding gate to open. Each trip device 10 is mounted a distance above the rails less than the thickness of the pieces of lumber that are to pass through the gate 7 which it controls, and greater than the next thinner pieces of lumber to be separately segregated. Thus all pieces of lumber of like thickness make contact with the same trip device and hence pass through the same gate. The separation of the trip devices 10 from the platform decreases in going from left to right. In FIGURE 4 the piece of lumber 9 has a thickness which is less than the separation of platform and devices $10_1$ and $10_2$ but greater than the separation between the platform and device $10_3$. This lumber therefore comes into contact with trip device $10_3$ and drops through gate $7_3$ as device $8_3$ is actuated.

FIGURES 5 and 6 show the arrangement of three pairs of a series of trip devices, $11_1$ $12_1$, $11_2$ $12_2$ and $11_3$ $12_3$ so arranged as to effect the segregation of lumber into pieces of uniform width. All pieces of lumber 13 moving from left to right pass under and come successively into contact with the trip devices $11_1$ $12_1$, $11_2$ $12_2$, and $11_3$ $12_3$. The trip devices are grouped in pairs at progressively decreasing distances apart. The separation between each pair of devices is less than the width of the pieces of lumber that are to pass through the gate with which they are associated and greater than the width of the next narrower piece of lumber to be separately segregated. Thus all pieces of lumber of like width make simultaneous contact with the same pair of trip devices 11, 12 and hence pass through the same gate. Limit switches (not shown) operated by each pair of trip devices 11, 12 are connected in series to a power source and the associated electro-mechanical device 14 controlling the adjacent gate 15. Consequently both of any pair of trip devices must be simultaneously in contact with the piece of lumber passing under them in order that the corresponding series connected limit switches be simultaneously closed allowing current to flow to the associated electro-mechanical device 14, to which they are connected so that it may open the associated gate 15.

In FIGURE 6 the piece of lumber 13 shown is of a width less than the separation of the first two pairs of trip devices 11, 12 and greater than that of devices $11_3$, $12_3$. It thus passes under the first two pairs but causes both $11_3$ and $12_3$ to be raised at one time, thus actuating electro-mechanical device $14_3$ which opens gate $15_3$ allowing it to drop from the platform.

It should be noted that in these thickness and width sorting machines the trip mechanisms are arranged to "fail safe." If a piece of lumber is warped or has a protruding splinter or knot in the path of a trip mechanism, it is segregated along with the thicker or wider pieces. This is important for two reasons. Firstly, a smaller than standard piece cannot cause damage when fed at a high rate of feed into a remanufacturing machine such as a planer, whereas larger than normal pieces could. Secondly, a smaller than normal piece of lumber is not liable to cause instability in the unit pile of lumber for handling by fork or lift truck. Breakdown of these loads when they are being moved or even when piled in the storage yard due to wind or other causes is both hazardous and expensive.

FIGURES 7 and 8 show the arrangement of three of a series of trip devices $25_1$, $25_2$ and $25_3$ so arranged as to effect the segregation of the lumber into pieces of uniform grade. A man, a lumber grader, moves each piece of lumber longitudinally against one of stops 21, 22, 23, 24 depending upon his classification of it.

Thus each piece of lumber will move so that the end which was in contact with the stop will thenceforth move along one of the lumber lines $21_1$, $22_1$, $23_1$, $24_1$. Trip devices $25_1$, $25_2$, $25_3$ etc. are placed so that the first one $25_1$ approached by the lumber will contact only with those pieces displaced longitudinally the greatest distance (in FIGURES 7 and 8) those moved against stop 24 and moving along lumber line $24_1$. The following trip device 25 is touched only by those pieces of lumber having the second greatest displacement and so forth. In FIGURES 7 and 8 the piece of lumber shown has been moved against stop 23 so that its end will travel along the lumber line 23. Thus it will miss trip device $25_1$ but will contact trip device $25_2$. The limit switch controlled by trip device $25_2$ is thus closed, and electro-mechanical device $27_2$ opens gate $28_2$ allowing the lumber to drop through.

Figure 9:
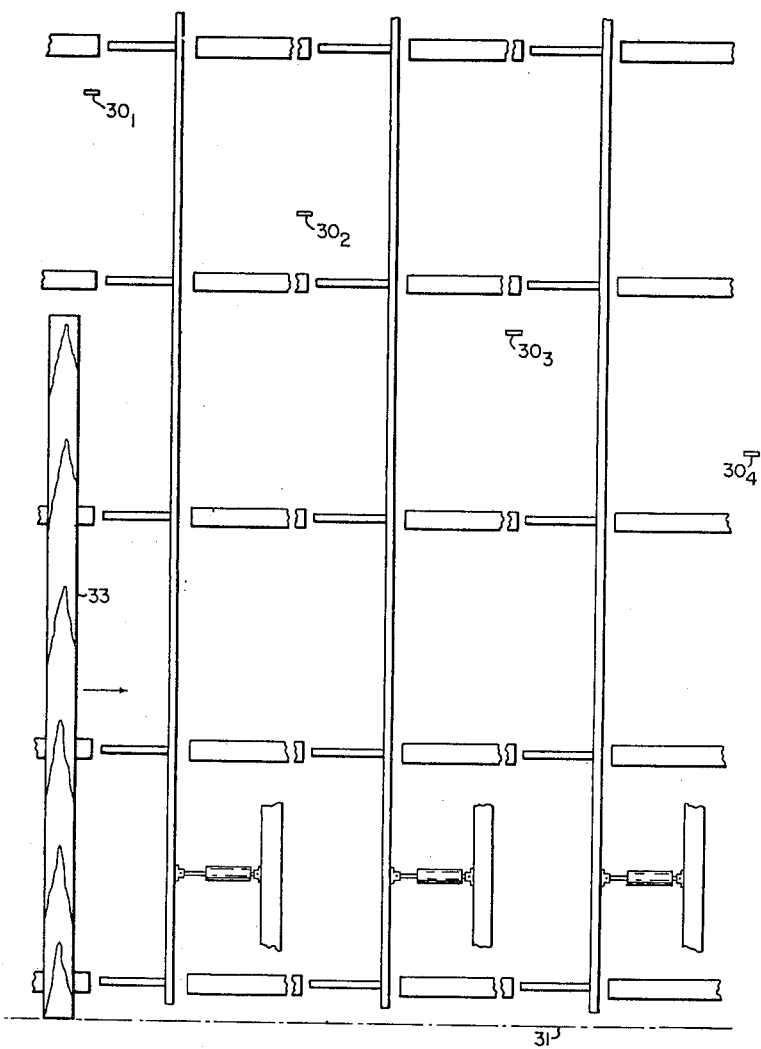
FIGURE 9 shows a plan view of a sorter for lumber length.
Figure 10:
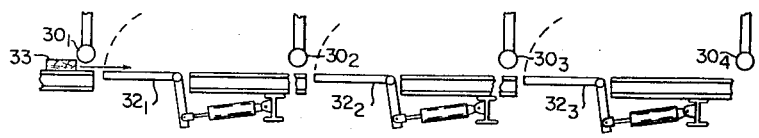
FIGURE 10 shows a side view of the sorter of FIGURE 9.

FIGURES 9 and 10 show four of a series of trip devices $30_1$, $30_2$, $30_3$ and $30_4$ so arranged as to effect the segregation of lumber into pieces of uniform length. All pieces of lumber move in the direction from left to right with one end moving along the lumber line 31. The trip devices $30_1$, $30_2$, $30_3$, $30_4$ etc. are placed in the path of the approaching lumber at successively smaller distances from the lumber line. Each successive trip device 30 is mounted a distance from the lumber line 31 less than the length of the pieces of lumber that are to pass through the gate 32 that it controls, and greater than the length of the next shorter pieces of lumber to be separately segregated. Thus all pieces of similar length make contact with the same trip device and hence pass through the same gate. In FIGURES 9 and 10 the piece of lumber 33 has a length which is less than the separation of $30_1$ and $30_2$ from the lumber line 31 and so passes over gates $32_1$ and $32_2$. The length of lumber 33 is however greater than the separation of trip device $32_3$ from the lumber line 31 and therefore gate $32_3$ is opened.

As shown in FIGURE 11, all pieces of lumber having a property of thickness, width, length or grade in common, (depending upon the type of sorting being carried out) is segregated by the sorting device by passage through the appropriate gate 35, drops into a bin 40 having a hinged bottom gate 41 held shut by a catch 42. FIGURE 12 illustrates the construction of one of the bins 40 and the bottom gate 41, showing the sides formed of steel channel or I-beams 43. When sufficient lumber has accumulated in any one bin to make up a unit package of the desired size, catch 42 is released allowing gate 41 to open, discharging the lumber onto chains 50. The bin bottom doors 41 are held in the open position to allow complete discharge of the lumber by electrically released holding catches 45 similar to the opening catches 42. The doors 41 would be returned to the closed position on release of the holding catches by means of a spring or counterweight (not shown), the doors being opened by the weight of the lumber. The counter for the bin concerned is reset to zero upon electrical release of the holding catches 45.

In this apparatus of FIGURE 11 it would normally be desirable to include an electric counter of the impulse motor type for each of the gates leading into each bin 40. This counter would be connected in parallel with the leads to the solenoid of the electro-mechanical device for the gate concerned and would thus advance the counter by one unit each time the gate were opened. The reading of each counter would be displayed on a board near the operator of the machine, and would enable him to know the load in each bin.

This enables a tally of the lumber by size and grade to be kept by the operator or by an automatic recording device attached to and operated conjointly with the electric counters. The recording device is not reset when holding catches 45 are released. The release of catches 42 and 45 could be solenoid operated and electrically controlled by switches adjacent to the counter dials mounted near the operator.

The lumber is transferred over the end of chains 50 and drops into the V-shaped well 51 formed between the steeply inclined skids 52 and the chains 53 which rise at an angle to the horizontal greater than the angle of repose of lumber. Only one chain 50 and chain 53 is shown, but it is understood that there would be at least one more of each directly behind that shown in FIGURE 11 to provide proper support for the lumber. The lugs 54 on the chains 53 have heights less than the thickness of the lumber so that only one piece at a time is carried upwards by the chains 53. All other pieces, not being restrained by the lugs, slide down to the bottom of the well 51 since the chains 55 rise at an angle greater than the angle of repose of the lumber on the chains. Each set of lugs 54 on the various chains 53 are aligned at right angles to the direction of travel of the chains and since the chains 53 are all driven at the same speed, the lumber is carried at right angles to the chains 53 one piece at a time to one of the automatic or semi-automatic lumber stackers now in common use throughout the lumber industry. Two particular types of stacker will be discussed later.

FIGURE 13 shows a method by which one trip device 60 may be used for selecting lumber of different thicknesses as required. Only one of the limit switches $61_1$, $61_2$, $61_3$ and $61_4$ is energized by closing the corresponding manual switch $66_1$, $66_2$, $66_3$ or $66_4$. Each limit switch is closed by a cam surface $65_1$, $65_2$, $65_3$ and $65_4$ at a different height of the wheel 64, mounted to rotate on axle 70 on stem 63. The gate associated with the trip device is opened when the energized limit switch is thus closed by the associated cam on the stem 63, since current then flows to its solenoid 67 from source 68. A counter of the impulse motor type 74 connected across solenoid 68 is advanced at the same time. As an example, if manual switch 66 is closed thus energizing limit switch $61_2$ the gate operated by the trip device opens when a piece of lumber of sufficient thickness to raise the stem and close limit switch $66_2$ passes underneath on platform 69. The closure of limit switch $61_1$ by cam $65_1$ on stem 63 does not cause the gate to open since that limit switch is not energized, manual switch $66_1$ being open. A trailing shoe 71 is provided on stem 63 and ensures that the stem is maintained in the raised position until just before the lumber falling through gate 72 passes beyond the edge 73 of platform 69, so that there is no danger of the gate's closing before the lumber has fallen through.

In a similar way pairs of trip devices only one pair of which is energized at a time, may be arranged to open one gate as different widths of lumber pass, and a plurality of separate trip devices may be set to be energized separately so as to enable several different lengths to pass through one gate as required. This would increase the range of sizes that the machine could sort without an increase in the number of bins 40 and for example in some cases, with six bins and a length sorter say it might be advantageous at one time to sort more than one length group into one bin such as in the following length groups—6' and 8', 10' and 12', 14', 16', 18' and 20', 22' and 24', whereas if shorter lumber was being sorted the following lengths could be separately piled—6', 8', 10', 12', 14' and 16'.

The electro-mechanical devices which open the gates may be completely electrical (i.e. solenoids) or may be air or hydraulic cylinders controlled by solenoid or machanically operated valves. As a final simplification the gates might be operated by a mechanical linkage only to wheel 64. It is believed however, that the use of limit switches, and solenoid valves for air or hydraulic cylinders directly actuating the gates probably represents the soundest practical design at present using standard components.

In the majority of applications of automatic lumber sorter, two main sorting functions will normally be required; those for thickness and width in the sawmill, and grade and length during subsequent manufacture, processing, drying, shipping or storage. The two following designs are feasible if the machine is to be used to sort for thickness and width exclusively, or for grade and length exclusively.

Figure 14:
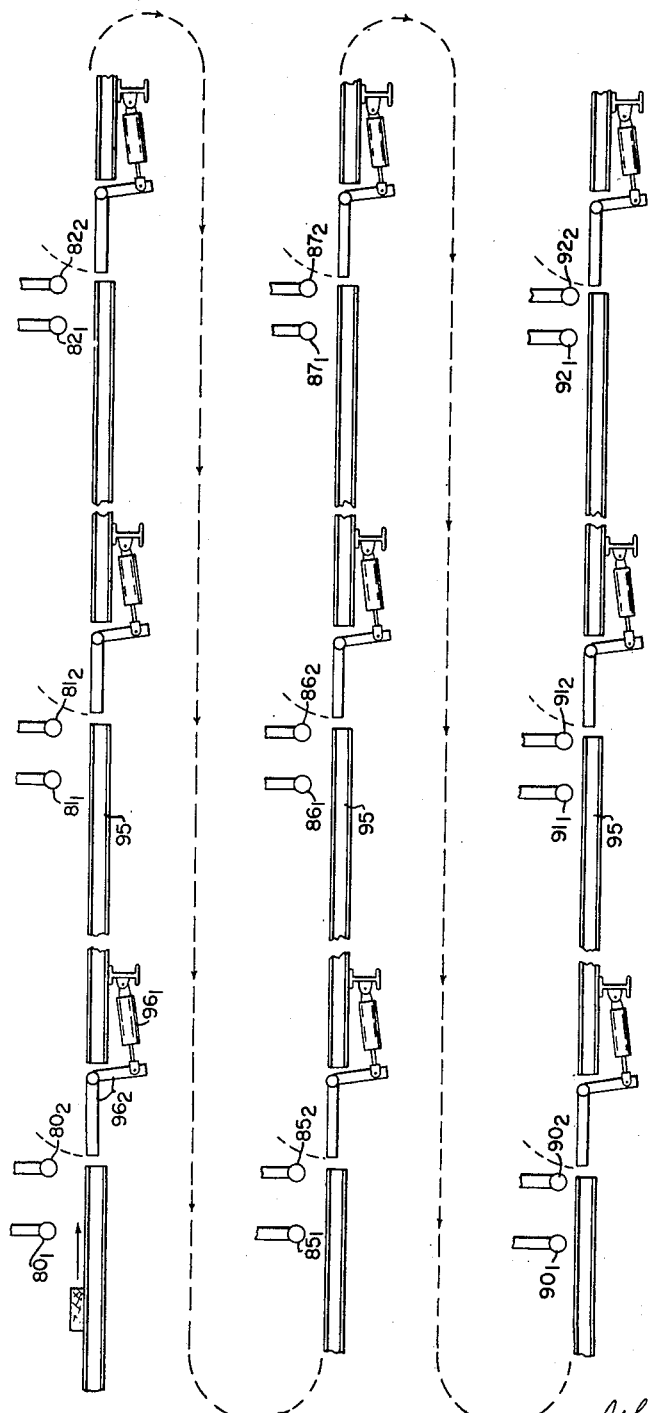
FIGURE 14 shows a side view of a sorter for lumber thickness and width.

FIGURE 14 shows three groups of pairs of a series of trip devices, $80_1$, $80_2$, $81_1$, $81_2$, $82_1$, $82_2$, etc. being one group; $85_1$, $85_2$, $86_1$, $86_2$, $87_1$, $87_2$ etc. being a second group; $90_1$, $90_2$, $91_1$, $91_2$, $92_1$, $92_2$, being the third group, of a series of trip devices so arranged as to effect the segregation of lumber into pieces of uniform thickness and width. All the trip devices within each group are mounted at the same height above the platform 95. Each group of trip devices is mounted a distance above the platform less than the thickness of the pieces of lumber that are to pass through the gates controlled by the trip devices of that group, and greater than the next thinner pieces of lumber to be separately segregated. Within each group the trip devices are mounted in pairs at progressively decreasing distances apart, which distances are repeated in each group. The clearance between each trip device of a pair is less than the width of the pieces of lumber that are to pass through the gates that they control and greater than the width of the next narrower piece of lumber to be separately segregated. All pieces of lumber of similar width and thickness make simultaneous contact with the same pair of trip devices in one group. The limit switches operated by each pair of trip devices are connected in series to a power source and the electro-mechanical device controlling the associated gate $96_2$, and consequently simultaneous, contact, of pair with a piece of lumber allows the electro-mechanical device to open the gate.

FIGURE 15 shows the arrangement of a series of trip devices so placed as to effect the segregation of lumber into pieces of uniform grade and length. A man, a lumber grader, moves the pieces of lumber longitudinally against one of the stops 120 to 123 so that the ends of all pieces of the same grade are temporarily in contact with the stop which represent that grade and thenceforth move across the platform along lumber lines in a similar manner as described for FIGURES 7 and 8. Groups of trip devices $100_1$, $101_1$, $102_1$, $110_1$, $111_1$, $112_1$, etc. are placed so that those of the first group will contact only the lumber displaced longitudinally the greatest distance to stop 120. The members of the following group of trip devices are touched only by those pieces of lumber having the second greatest displacement to stop 121 and so forth.

Opposite each device $100_1$, $101_1$, $102_1$ in the first group, in a line parallel to the length of the lumber and at successively smaller distances is a pairing trip device $100_2$, $101_2$, $101_3$ respectively. Thus, within each grade group all pieces of lumber of similar length make contact with the same pair of trip devices, and hence pass through the same gate. The limit switches on each pair of trip devices are connected in series with each other, a power source, the electro-mechanical device which operates the adjacent gate controlled by that pair of trip devices. A piece of lumber, having been displaced against one of the stops by the grader man, will come into contact only with a pair of trip devices in that grade. Further, within each group all pieces of similar length pass through the same gate.

In FIGURE 15 the piece of lumber shown, is of such a grade that it is moved against stop 122. It thence passes all the devices $100_1$, $101_1$, $102_1$ etc. and $110_1$, $111_1$, $112_1$ etc. without coming into contact with them. It cannot thus be in simultaneous contact with a pair of actuating devices. The lumber strikes all the trip devices $115_1$, $116_1$, $117_1$ but not trip device $115_2$. The lumber does however, make simultaneous contact with $116_1$ and $116_2$.

In these last two embodiments (FIGURES 14 and 15) all pieces of lumber pass through gates directly into bins and are thence discharged onto chains dropped into a well and transferred to a lumber stacker by an inclined conveyor in the manner previously described for FIGURE 11.

It should be understood that by suitable arrangement of the trip devices sorters for any two or even three or four qualities of the lumber may be constructed.

*Tally Mechanism*

When a sorter is being used to classify lumber for grade and length, a record of the number of pieces passing into each bin as given by the electrically operated counter for that bin (described for FIGURE 11) enables an exact tally of the feet board-measure of each separate grade and length to be made. All pieces of lumber passing through would be of the same thickness and width during one "run" and all pieces passing into any one bin are of the same length and grade.

When however, the automatic lumber sorter is being used to sort lumber for thickness or width or grade, alone, or when no length classification is made, pieces of varying length pass into any one bin, and thus an exact tally of the feet board-measure of the lumber sorter cannot be made.

FIGURES 16a and 16b are partly schematic diagrams showing an automatic sorter for thickness and width which can also record the length of lumber classified. Trips $150_1$, and $150_2$ are those for determining the thickness and width of lumber to be passed through the gate controlled by solenoid 166 (such as described for the apparatus of FIGURE 14). There are in addition contactor devices 120 to 124 which operate associated counters 140 to 145. These contactor devices are placed on a line parallel to the length of the lumber, (i.e. perpendicular to the lumber line) passing between the points of contact of trip devices $150_1$, and $150_2$. Contactors 121 to 124 are thus behind 120 as shown in FIGURE 16a, and each is coupled to a switch 130 to 134 for operating a respective counter. The contactors all also have trailing shoes, such as 155 for contactor 120, so that once struck by lumber the limit switch remains operated during a period starting before and ending after the lumber is in contact with trip device $150_2$. Each contactor device 120 to 124 is mounted a distance from the lumber line less than the length of the piece of lumber being counted and greater than the length of the next shorter pieces that are counted separately.

It can be seen in FIGURES 16a and 16b that a piece of lumber of sufficient width and thickness to come into simultaneous contact with trip devices $150_1$ and $150_2$ closing limit switches $160_1$ to $160_2$ allows current to flow to the relay 165 closing its contacts permitting current to flow both to the electro-mechanical device 166 opening the gate, and to energize the limit switches 130 to 134. The relay 165 remains energized and its contacts remain closed until the lumber passes trip device $150_2$ when the contacts of limit switch $160_2$ open.

The switches 130 to 134 connected electrically to solenoids 140 to 145 of electrically operated counters, are double pole single throw switches. Contacts 175 are normally open and contacts 176 are normally closed when the corresponding contactor devices are not in contact with lumber passing through. When the associated contactor is raised by contact with the lumber, contacts 175 are closed and contacts 176 are opened.

The counter associated with each solenoid 140 to 145 is of the impulse type and is advanced by one integer every time current flows through its solenoid.

One side of counter solenoid 140 is connected to one terminal of electro-mechanical device 166; the other side is connected in series to the normally closed contacts 175 of the limit switch 130 closest to the lumber line, and to the other terminal of electro-mechanical device 166. If a piece of lumber closes limit switches $160_1$ and $160_2$ simultaneously but is too short to come into contact with 120, the electrical circuit is completed to counter solenoid 140 across the normally closed contacts 176 of limit switch 130 and the total shown on the counter associated with solenoid 140 is increased by one.

The remainder of the counters with the exception of the one most remote from the lumber line, recording the longest lengths, have their solenoids connected so that, one side of each is joined to one terminal of electro-mechanical device 166 and the other side of the solenoid is connected in series with the normally closed contacts 176 of the limit switch adjacent to and further removed from the lumber line than the limit switch whose closing is to be recorded. The connection then goes from contact 176 to the normally open contacts 175 of the limit switch whose closing is to be recorded by the counter, and thence to the other terminal of electro-mechanical device 166. Thus the total is increased by one only on the counter in series connection with the normally open contacts 175 of that limit switch closed by the passing lumber situated most remotely from the lumber line. The open contacts 176 of all limit switches operated by passage of the lumber break the circuits to and hence de-energize the switches for counters placed closer to the lumber line. The open contacts 175 of all limit switches not operated by the passing lumber prevent energization of switches placed farther from the lumber line.

The final counter solenoid 145 is connected to one side of the electro-mechanical device 166 and to the normally open contacts $175_5$ of the switch most remote from the lumber line. Hence any lumber longer than that required to strike contactor 124 at a time when electro-mechanical device 166 is energized closes the electrical circuit to this counter and increases the total shown by one.

In FIGURES 16a and 16b the piece of lumber shown passing through is of sufficient thickness and width to be in simultaneous contact with devices $150_1$ and $150_2$ closing the series connected switches $160_1$ and $160_2$ thus energizing the coil of the relay permitting current to flow to the electro-mechanical device 166 and opening the gate to which it is attached, and also energizing the switches 130 to 134. When the lumber ceases to contact device $150_1$ and switch 160 opens, relay 165 remains closed under the control of switch $160_2$ and current continues to flow through solenoid 166. The lumber shown is of a length such that it encounters contactors 120, 121 and 122. The only completed counter circuit from the energized terminals of electro-mechanical device solenoid 166 lies through closed contacts 175 and 176 to counter solenoid 143. Thus the total on the counter associated with solenoid 143 is increased by one.

Although the description of FIGURES 16a and 16b is directed to a sorter for thickness and width, it will be understood that any one of the other sorters described may make a tally of the length of lumber by including the contactors such as 120 to 124 and their associated counter mechanism. It is only necessary to ensure that the counters are sufficiently quick acting that they can record in the length of time during which the electro-mechanical device for the associated gate is energized and the switches operated by the contactors are closed. Thus if the sorter of FIGURE 16 was adapted to classify for grade, relay 165 and switch 160, would be omitted. Trip $150_2$ would then operate a gate passing one grade classification.

In FIGURE 17 pieces of lumber 180 arriving on conveyor 53 are discharged down the chute 182 into the loading section of a tilt hoist stacker. This stacker basically comprises a set of beams 186 (behind one another in the view of FIGURE 17) which are free to rock from a vertical to an inclined position, about a hinge 187. A pulley wheel 188 is mounted on the upper end of each beam. A cable 189 passing round each pulley connects a winding drum 190 with sliding supports 185 upon which lumber is stacked. Each support 185 is free to move in the direction of arrows 191 on its beam 186. Before the loading of lumber begins, the beams 186 assume vertical position and are then wound into that shown in FIGURE 17 at about 45° to the horizontal and against stops 192 by rotating drum 190. Further rotation of the drum 190 raises the supports 185 so that they are in a position to receive the first pieces of lumber sliding down the chute 182. As the first course of lumber 183 is stacked, a brake on the drum 190 is released to allow supports 185 to descend down the beams 186 by the thickness of one course of lumber. The next course 193 thus builds up by lumber falling off chute 182. This process is continued until a sufficient load is obtained and drum 190 is then slackened off further until the centre of gravity of the system supported on hinge 187 moves over the vertical through the hinge. The members 186 thus assume the vertical position again. When members 36 are in the vertical position, the load is allowed to descend further until its weight is taken by rolls 192 (mounted one behind another in FIGURE 17). The lumber is thence moved off longitudinally along the rolls 192a for removal by a fork or lift truck.

In FIGURE 18 a reciprocating arm stacker is shown. Lumber 200 arriving on conveyor 53 slides down chute 199 on to chains 202, whence it comes to rest against stops 204. When sufficient lumber is collected behind stops 204 to form a course 208 for stacking a second stop 203 is raised to hold back any further lumber 200. Beneath chains 202 is a reciprocating arm 201 driven by a connected rod and other means not shown, which moves, so that its tip 206 follows the dotted path 207. Each course of lumber 208 is lifted thus from the chains 202 by the arms 201 and delivered into the position shown on top of the load being piled on the buggy 211. After each course is placed in position, stickers 209 are placed to space and support the next course and also provide a clearance for the reciprocating arms 201 in the position shown in FIGURE 18, so that they may be retracted to the situation beneath the chains 202. Course 215 has just been placed on top of stickers 209 on course 210 in FIGURE 18. As each course is completed the buggy descends by the width of one course plus that of the stickers by lowering the hydraulic jack 212. When the load is completed, the jack 212 is collapsed so that wheels 213 of the beam engage rails 214. The load is then moved off along the rails for removal by a fork or lift trucks as when the tilt hoist stacker.

While the lumber sorter so far described is adequate for sorting rough lumber, some modification may be required for handling dressed lumber where care must be exercised to prevent the finished surface from becoming marred. The sorter is unaltered except that the gates 41 of FIGURE 11 are replaced by vertically movable platforms. In operation, these platforms reduce the distance that the lumber drops freely when entering a bin, and, later, lower the lumber gently onto the chains when a bin is emptied.

Referring now to FIGURES 19, 20, 21, 24 and 29, each platform 220 comprises a horizontal longitudinal member 222, to which sloping lumber supporting arms 223 are attached at suitable intervals along its length. Guide wheels 232, attached to the upper ends of two of the arms 223, running in vertical grooves 219 (FIGURES 20, 24 and 29) in the bin side, prevent horizontal movement of the platform 220. The arms 223 are perpendicular to the length of the longitudinal member 222 and at an angle to the horizontal greater than either the angle of repose of lumber on the arms or of lumber on a layer of lumber. The platform 220 is suspended from four wire rope cables 225, two being attached to the upper ends of two of the lumber supporting arms 223 and two attached to arms 221 on each end of the longitudinal member 222. In FIGURE 21, these cables 225 are carried via pulleys 230 to a gusset plate 216 which is subject to movement by a cable associated with hydraulic cylinder 228. In FIGURE 22, the cables 225 are carried over pulleys 230 where necessary, to drums 231 keyed on a common shaft 241. A torque can be applied to the shaft 241 and the drums 231 by the apparatus shown in FIGURE 23.

In FIGURE 21 hydraulic cylinder 228 is operated from control valve 229 connected to pressure line 260 and return line 261. When solenoid 246 is energised, fluid is applied through valve 229, by movement of arm 262, to cylinder 228 to raise platform 220, when solenoid 247 is energised the pressure in cylinder 228 is released. In the central position of arm 262 fluid is prevented from flowing either to or from cylinder 228 thus maintaining platform 220 in a fixed position. The "raising" solenoid 246 is operated by closing of the contacts of relay 236 when the manual push button 243 is pressed. The relay 236 remains electrically locked in this position until the actuation of the limit switch 227 or the opening of the manual push button switch 244 breaks the relay locking circuit. The "lower" solenoid 247 is operated either by the actuation of the limit switch 227 or the closing of the push button switch 233.

When the drive of FIGURE 23 is used in conjunction with the suspension system shown in FIGURE 22, torque is conveniently applied to the shaft 241 by means of a roller chain drive, one sprocket of which (not shown) is keyed to the shaft 241, the other sprocket 240 being keyed to the output shaft 217 of the speed reducing gear box 239. The drive of FIGURE 23 can also replace the cylinder 228 (FIGURE 21) and the associated cable for gusset plate 216 by placing a drum 248 carrying a cable 218 on the shaft 217. The cable 218 is then connected to move the gusset plate.

In more detail the drive of FIGURE 23 comprises an electric motor 237 arranged to drive the input shaft of gear box 239 in a manner to increase the tension in the cables 225 and raise the platform 220. The platform is held at rest vertically by a magnetic brake 238 on the shaft of the motor 237 and is lowered by releasing this brake when the motor is disconnected from its power source. Braking effort is applied by a spring (not shown) and released by connecting the coil of the brake solenoid to a suitable electric power supply. Hence to raise the platform 220 the manual "raise" button 243' of the magnetic contactor 242 is pressed. The motor is started and simultaneonsly the brake is released. The motor is stopped either by engagement of the limit switch 227' (FIGURES 23 and 24) or by pressing the manual "stop" button 244' of the magnetic starter 242. The platform 220 is lowered during engagement of lumber with the limit switch 227' or by pressing the manual push button 233' which acts as an overriding control for the limit switch. FIGURE 23 shows the position of the various electrical contact devices when the motor 237 is disconected, the brake 238 engaged and, in consequence, when the platform 220 is held at rest.

FIGURE 24 shows the platform 220 at the top of the bin at the beginning of a cycle of operation. The first piece of lumber 224 entering the bin slides down the arms 223 and depresses the actuating arm 226 of the limit switch 227, 227' causing the platform 220 to descend until the lumber 224 is moved out of contact with the arm 226 which returns to its original position, breaking the contact within the limit switch 227, 227' and causing the platform to come to rest. The second piece of lumber entering the bin slides down the arms, coming to rest against the first piece, and so forth until a layer of lumber covers the tops of the arms (see bin 40' FIGURE 19). The next subsequent piece slides over the top of the layer of lumber, depresses the arm 226 and causes the platform 220 to lower until the arm is freed. A second layer of lumber is then built up. This process is continued (see bin 40''' FIGURE 19) until the required number of pieces to make a unit package of the desired size has accumulated in the bin (see bin 40''). Push button 233 or 233' (FIGURES 21 and 23) is then depressed causing the platform to descend and deposit the lumber 224 on the chains 50 which convey it to the separating and straightening chains and the lumber stacker (FIGURE 11). It may be noted that further slackening of the cables 225 after the guide wheels 232 (FIGURES 21 and 22), come into contact with the stop caused by rail 245 (FIGURES 19 and 20), will allow the outer ends of the platform arms 223 to drop, increasing their slope and insuring the complete emptying of the bin. When all the lumber has passed onto the chains 50, manual push button 243 or 243' is depressed causing the platform 220 to rise within the bin until the lower end of one of the platform arms 223 actuates the limit switch arm 226 stopping the motion of the platform in the position it held at the beginning of the cycle.

Should certain sizes of lumber tend to roll rather than slide down the platform arms 223, a shaped spring steel arm 252 (FIGURE 24) in conjunction with a second actuating arm 253 operating the limit switch 227 may be suspended above the layer of lumber formed on the platform arms 223. The shaped arm 252 is pivoted at 254 so that the limit switch 227 is closed and the platform 220 lowered when a piece of lumber, jutting appreciably above the normal height of the top of the lumber layer, comes into contact with it. This ensures the lowering of the platform 220 even of the lumber fails to form a smooth layer on the platform arms 223. In an alternative embodiment the shaped arms may be arranged to operate a second limit switch series connected with limit switch 227.

In FIGURE 11 the laterally spaced synchronously driven inclined conveyor chains 53 have been described as including a series of lugs 54 on each chain aligned with respect to the lugs on the adjacent chains. When the simple lugs 54 are used particularly if they are widely spaced, it is possible for the lumber to be carried crookedly up the conveyor 53. This does not occur often enough to be a serious drawback if the conveyor is run at moderate speed, but when it is intended to operate at a high rate, it has been found that the performance of this conveyor can be improved if the separate lugs 54 are replaced by long lugs 260 (see FIGURES 25–28) attached to more than one chain (FIGURE 28). These lugs 260 have tapered ends 261 which help in preventing any lumber from being caught by one end only.

I claim:
1. A lumber handling system comprising, a lumber platform, means for moving lumber transversely across said platform, a plurality of gates in said platform, each said gate having an open and a closed position, said lumber being carried across each said gate when in its closed position, and dropping from said platform through a said gate when in its open position, a plurality of electrical trip means above said platform, each of said trip means being associated with a respective gate, said trip means being so placed relatively to said platform for engagement by lumber when of a chosen dimension to open said respective gate, a bin below each said gate, a platform in said bin for receiving and supporting lumber entering the bin and inclined at an angle to the horizontal greater than the angle of repose of lumber on said bin platform and of lumber on other pieces of lumber in said bin, means for lowering the bin platform, a limit switch in said bin for engagement by lumber on said bin platform projecting above a chosen level in said bin, said switch being connected to said lowering means to lower said bin platform to move said lumber out of engagement with said switch, means for releasing lumber from said bin, a lumber transfer below said bin for receiving lumber released from said bin, an inclined conveyor comprising a plurality of laterally spaced members being advanced at the same speed as one another, lugs on said members for holding a piece of lumber transversely to the direction of travel of the inclined conveyor, said lugs projecting from said members sufficiently only to engage and carry a single piece of lumber, said transfer being arranged to discharge lumber transversely into a well for gripping by said inclined conveyor lugs, whereby lumber is discharged one piece at a time from said inclined conveyor with its length transverse to the direction of discharge.

2. A system as defined in claim 1 wherein said lowering means comprises a hydraulic piston and cylinder assembly for supporting said bin platform, said switch when engaged by said lumber releasing fluid from said cylinder to permit descent of said bin platform.

3. A system as defined in claim 1 comprising a shaft connected to said bin platform for raising said bin platform by rotation of said shaft, a brake for preventing rotation of said shaft and descent of said bin platform under gravity, said limit switch releasing said brake when engaged by said lumber.

4. A system as defined in claim 3 comprising a motor for rotating said shaft for raising said bin platform.

5. A system as defined in claim 1 wherein said inclined conveyor lugs extend transversely to said direction of travel, each lug being carried on at least two adjacent laterally spaced members.

6. A system as defined in claim 1 wherein said inclined conveyor rises from said well at an angle greater than that of repose of lumber on said laterally spaced members and of lumber on other pieces of lumber.

7. A system as defined in claim 4 comprising an electrical push button for operating said motor.

8. A system as defined in claim 1 including an overriding control for said limit switch for lowering said bin platform independently of said limit switch.

9. In a lumber handling system wherein lumber is caused to move across the platform containing a plurality of gates and wherein said lumber drops from said platform through a chosen one of said gates in accordance with a chosen dimension of the lumber, a bin below each said gate, a platform in said bin for receiving and supporting lumber entering the bin and inclined at an angle to the horizontal greater than the angle of repose of lumber on said bin platform and of lumber on other pieces of lumber in said bin, means for lowering the bin platform, a limit switch in said bin for engagement by lumber on said bin platform projecting above a chosen level in said bin, said switch being connected to said lowering means to lower said bin platform to move said lumber out of engagement with said switch, and means for releasing lumber accumulated in said bin.

References Cited in the file of this patent
UNITED STATES PATENTS

| | | |
|---|---|---|
| 1,706,632 | Onstad | Mar. 26, 1929 |
| 2,849,236 | Beaulieu | Aug. 26, 1958 |
| 2,998,133 | Rambo | Aug. 29, 1961 |